United States Patent [19]

Galsterer et al.

[11] Patent Number: 5,700,535
[45] Date of Patent: Dec. 23, 1997

[54] SHEET OF LABELS, METHOD OF PRODUCTION AND EQUIPMENT

[75] Inventors: Wolfgang Galsterer, Munich; Andreas Schlegel, Otterfing; Martin Utz, Munich, all of Germany

[73] Assignee: Zweckform Büro-Produkte GmbH, Oberlaindern/Valley, Germany

[21] Appl. No.: 331,647

[22] PCT Filed: Mar. 11, 1994

[86] PCT No.: PCT/EP94/00761

§ 371 Date: Feb. 8, 1995

§ 102(e) Date: Feb. 8, 1995

[87] PCT Pub. No.: WO94/20944

PCT Pub. Date: Sep. 15, 1994

[30] Foreign Application Priority Data

Mar. 11, 1993 [DE] Germany ............ 43 07 749.8

[51] Int. Cl.⁶ .................. B31D 1/02; G09F 3/02
[52] U.S. Cl. .................. 428/40.1; 40/299; 283/81; 283/101; 428/41.7; 428/41.8; 428/42.1; 428/42.2; 428/42.3; 428/43; 428/77; 428/78; 428/79; 428/192; 428/220
[58] Field of Search .................. 428/40, 41, 42, 428/43, 192, 220, 78, 79, 77; 283/81, 101; 40/299

[56] References Cited

U.S. PATENT DOCUMENTS

| 4,246,058 | 1/1981 | Reed | 156/183 |
|---|---|---|---|
| 4,281,762 | 8/1981 | Hattemer | 428/42 |
| 4,544,590 | 10/1985 | Egan | 428/42 |
| 5,091,035 | 2/1992 | Anhäuser | 156/344 |

FOREIGN PATENT DOCUMENTS

| 0255396 | 2/1988 | European Pat. Off. . |
|---|---|---|
| 0377289 | 7/1990 | European Pat. Off. . |
| 390366A2 | 10/1990 | European Pat. Off. . |
| 7273204 | 3/1973 | Germany . |
| 88/07737 | 10/1988 | WIPO . |

*Primary Examiner*—Nasser Ahmad
*Attorney, Agent, or Firm*—Dilworth & Barrese

[57] ABSTRACT

Described is a sheet of labels made from label material composed of non-sticky substrate material, an intermediate adhesive layer and top material, the surface area of the top material being smaller than that of the substrate to the extent that the edges of the substrate material project out on all sides of the sheet beyond the edges of the top material. A sheet of this kind prevents particles of adhesive from being transferred to parts of machines in an installation in which the sheets are further processed, irrespective of which side is used to draw the sheet into the processing installation.

35 Claims, 1 Drawing Sheet

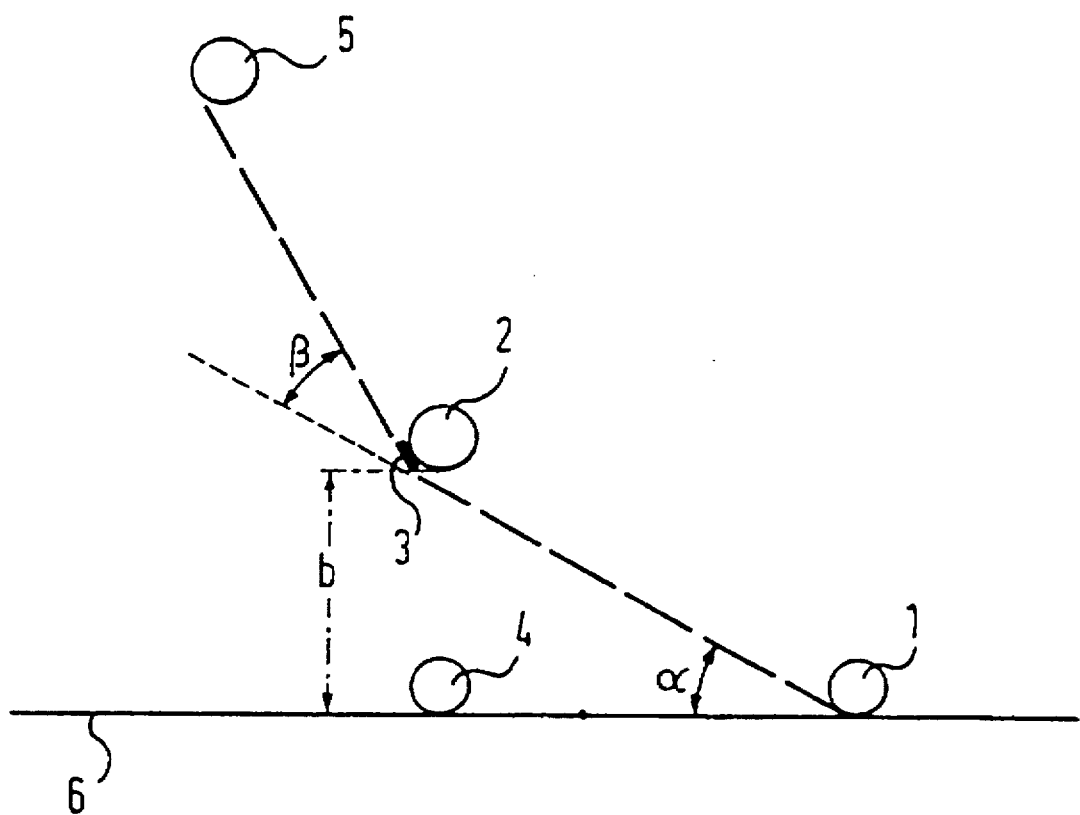

SHEET OF LABELS, METHOD OF PRODUCTION AND EQUIPMENT

BACKGROUND OF THE INVENTION

The invention relates to a sheet of labels and a method as well as a device for its production.

Label materials are generally constructed from a non-stick substrate material, a contact adhesive and a top material. They are produced by coating the substrate material or the top material with the contact adhesive and subsequently performing a lamination with the top material and/or substrate material. The formed integrated system is subsequently rolled up, wherein the rolls are often trimmed on the side surface and are also optionally cut to narrower rolls.

First, the rolled up label material is unrolled in printing machines for the production of sheets of labels and optionally printed. Subsequently, the top material and optionally also the substrate material is stamped in a pre-determined pattern, and the stamped-out top material is pulled off as a lattice matrix. From the stamped and stripped continuous ribbon, the individual sheets of labels are finally obtained through longitudinal cuts and cross cuts and/or cross perforations and subsequent lay-up and/or folding and subsequent separation on the perforation lines.

Cutting steps are employed in the above production wherein a solid medium vertically cuts the integrated system of substrate material, contact adhesive and top material into two. Examples for the solid medium are knives rotating in the direction of motion of the web or crosswise to the direction of motion of the web, a blade fixed in the direction of motion of the web or knives oscillating in the direction of motion of the web.

In these cutting steps the problem exists that the fixed cutting medium can pull out contact adhesive particles from the cut edges. How pronounced this problem appears depends on the production speed (web running speed), the characteristics of the layer materials of the labels (for example the tendency to spray of the contact adhesive) and also the characteristics of the cutting medium (for example sharpness of the knife). These contact adhesive particles pulled out of the label material then remain on the cutting medium and adhere to the cut edges of the label material. An adhesive sticking to the cutting knife causes especially an unclean cut because it produces a rasp effect on the edges of the sheet of labels.

Sheets of labels with adhering, more or less lose contact adhesive particles and with unclean cut edges are undesirable if they are to be further processed by machine because the adhering particles are stripped by manifold contact with the corresponding machine parts and dirty the further processing equipment.

Also when the sheets of labels are processed with clean and/or smooth cut edges, the above disadvantageous effect appears—if, however, more slowly. In the further processing, the sheet of labels often stands under vertical pressure (for example in the further transport) or under the action of heat (for example by printing or through lost machine heat) whereby the contact adhesive comes out over the smooth edges and/or bleeds out and thereby comes in contact with the machine parts.

Sheets of labels with unclean cut edges have a particularly destructive effect when they are further processed and/or printed in electronic data processing printing machines such as laser, ion, magnet printers, ink jet printers, thermal and transfer printers as well as in copying and fax equipment that work according to these printing principles. Sticking contact adhesive particles adhere to the machine parts of the transport path such as for example feed rollers, separation plates and guide plates, grippers, semi-conducting drums and fixing rollers. Subsequent sheets of labels stick again to these stripped contact adhesive particles and are thus hindered in their course. The consequences are a hesitation or even a discontinuation of the transport or a deflection of the sheet of labels from the normal transport path and therewith a negative influence on the productivity of the further processing and print quality. Contact adhesive particles sticking to the machine parts conferring information, such as for example the semi-conducting drum of a laser printer, negatively influence and prevent printing at these places. Machine parts comprising plastics, as for example fixing rollers, or parts having highly sensitive surface layers, such as for example semi-conducting drums, are gradually worn out and damaged through the constant effective adhesion, tearing and rubbing forces which are caused by sticking contact adhesive particles in the passage of sheets of labels or other subsequent printing substrates, such as for example paper.

In order to avoid these disadvantages, two different manners of solution were previously followed.

According to the solution described in EP-A-0 255 396, the outer cut edges of the sheet of labels are coated with a lacquer which functions after hardening such that sticking contact adhesive particles more or less loosely adhering to the edges are bound and such that no contact adhesive can come out and/or bleeds out over the edges under further processing conditions.

The disadvantages of this method consist in the fact that an additional coating and hardening step is necessary, the label product is treated with additional chemicals which is undesirable for health or environmental reasons, and that the effect of the obstruction of the escape of contact adhesive is abolished with the unintentional peeling of a border label in the further processing.

The second known solution comprises shaping the sheet of labels in such a way that the top material along the cut edges on the borders in the direction of motion of the web is in each case approximately 0.5 mm narrower than the non-stick substrate material. In the course of these sheets over for example electronic data processing printers, no contact adhesive is transferred to those places where the contact adhesive substrate material juts out and bumps against machine parts, such as for example guide plates, feed rollers, semi-conducting drums and fixing rollers because only the above substrate material edges free from contact adhesive particles bump.

The disadvantages of the products produced according to the above method consists in the fact that the above substrate material edge is only produced longitudinally, i.e. in the direction of motion of the web, such that the adhesive escape and transfer is only avoided on two edges (longitudinal edges), but not on both of the other edges (cross edges) of the sheet of labels. Consequently, two different products must be held in readiness depending on whether the sheet of labels is transported with the narrow or the wide side out in front through the further processing equipment (for example electronic data processing printers) because the impact of the front running edges on a feed roller, semi-conducting drum or a fixing roller is particularly critical with respect to the transfer of the contact adhesive. There is a substantial number of coping equipment that pull in and lead the sheet of labels with the wide as well as the narrow side head first.

Laser printers pull in the sheet of labels predominantly with the narrow side head first. Today, copying equipment and laser printers are generally common print and reproduction equipment in the office and stand next to each other for use such that pulling in the sheet of labels always with the same side head first is not possible and/or advantageous with all of this equipment.

SUMMARY OF THE INVENTION

Thus, an object of the present invention is to create a sheet of labels with which the disadvantages described above are avoided, especially the transfer of contact adhesive particles to machine parts of further processing equipment with which the sheet edges come in contact, independent of from which side the sheet of labels is pulled in into the further processing equipment.

A further object is to create an economically productive method for the production of such sheets of labels and a suitable device therefor.

An important and critical step with respect to the production speed (economic efficiency) of the method for the production of sheets of labels is the pulling off of the matrix of the top material. The stamped out matrix is pulled off from the web as a continuous ribbon over a deflection roller or a stationary edge such that it has the same absolute speed as the web, however the speed component in the direction of motion of the web lies under the speed of the web. The lattice is then separately wound. The deflection roller can be stationary, free rotating or driven. By given top material and given separation force of the top material from the non-stick substrate material, the production speed decisively depends on the angle between the plane of the matrix lattice ribbon and the plane of the substrate material at the pulling off point, the size and the evenness of the tension acting on the matrix lattice ribbon between the pulling off point and winding, and the form of the stamped out top material matrix, i.e. on the number and/or density of the longitudinal and cross margins per sheet of labels, the length and width of the longitudinal and cross margins, the type and shape of the junctions of longitudinal and cross margins (right angled, polygonal or round).

In order to obtain an increased production speed necessary for an economic method of production, the separation force of the top material from the non-stick substrate material is reduced in technical operation through the heating of the label material before pulling off the lattice matrix by leading the label material web over an electrically heated plate for example. Therewith, the separation force between the top material and non-stick substrate material is customarily reduced through heating of the contact adhesive.

However, the disadvantages that the originally set separation force between top material and substrate material can change after the heating and subsequent cooling are connected with such a method. A further disadvantage is to be seen in that the heating of the label material and therefore the separation force between the top material and the substrate material can also strongly deviate with deviation of the product speed (web running speed). Finally, the separation force at all places of the label material is diminished by this method such that the top material surface areas individual labels) also remaining on the non-stick substrate material after pulling off the matrix easily free themselves, especially with subsequent deflection of the continuous ribbon, or are easily lifted by incompletely exact stamping through of the top material at the place of the stamp line by pulling off of the matrix. Moreover, a disadvantage is also to be seen in that the method is not applicable with certain label products, namely then when the separation force between the top material and the substrate material is increased through heating.

Another method for the optimization of the production speed drives at specifically setting the angle between the pulling off plane of the matrix lattice ribbon and the direction of motion of the web of the continuously moving label material because the size of the separation force between top material and substrate material is also dependent among other things on the pulling off angle. This method can still be modified in that the matrix lattice ribbon is additionally pulled off diagonally to the plane of the direction of motion of the web of the continuously moving label material, i.e. at a certain angle for this and therewith shifted in time from a longitudinal side to the other longitudinal side of the lattice. However, with the above method it is not yet possible to reduce the separation force between the top material and the non-stick substrate material to such a degree and to weaken the tension appearing between longitudinal and cross margins of the matrix lattice by pulling off to such a degree that matrices with thin longitudinal and cross margins, but especially with thin cross margins, can be pulled off without these tearing and remaining stuck on the substrate or top material of the label material continuously moving in the direction of motion of the web, therewith negatively influencing the further processing and disturbing or even leading to a stopping of the machines.

Thus, the above object for the establishment of an economic production method for sheets of labels can be put more precisely in making available a method that avoids the above disadvantages of the known methods with respect to pulling off the matrix lattice ribbon and can be economically carried out productively, i.e. with higher production speed and/or web running speed. Furthermore, a device suitable for this is made available.

The first mentioned object is solved by means of a sheet of labels of a label material comprising non-stick substrate material, intermediate contact adhesive layer and top material, which is characterized in that the surface area of the top material is smaller than the substrate material such that the substrate material edge projects over the top material edge on all sides.

According to a preferred embodiment the distance between substrate edge and top material edge amounts to 0.1 to 2.0 mm, wherein 0.2 to 1.0 mm are especially preferred.

Furthermore, the sheet of labels is preferably rectangular shaped.

According to a particular embodiment the substrate material surface area and/or the top material surface area of the sheet of labels is printed upon, coated, cut, stamped and/or perforated.

Hereby, the top material surface area can be subdivided in individual section surface areas by cutting, stamping and/or perforating. Furthermore, individual section surface areas of the top material of the sheet of labels (matrix) can be pulled off. A further particular embodiment designates that the top material between the individual section surface areas (matrix) is pulled off.

The above mentioned section surface areas are preferably triangular, rectangular, square, polygonal, round or oval. By the rectangular or square section surface areas these have rectangular, polygonal or round edges.

The surface area of the substrate material of the sheet of labels preferably corresponds to German industry standard A0 to A6, wherein German industry standard A3 to A5 is preferred, and German industry standard A4 is particularly preferred.

The label material of the sheet of labels preferably has a surface area weight of 80 to 300 g/m², wherein a surface area weight of 120 to 200 g/m² is particularly favourable.

The non-stick substrate material of the sheet of labels is preferably comprised of paper, cardboard, a plastic or metal foil or integrated systems of them, and possess at least on the side facing the contact adhesive a separation agent that preferable constitutes silicone.

The contact adhesive for the sheet of labels is preferably selected from rubber, poly(meth)acrylate, polyvinyl derivative or a copolymer of this, polyamide, copolyamide, polyester, copolyester, copolyether, polyurethane, polyepoxide or polysiloxane or mixtures of these.

The top material of the sheet of labels is preferably represented by paper, cardboard, plastic or metal foils and/or their integrated systems.

By the processing in copiers and electronic data processing printers, a sheet of labels of the above mentioned type transfers no contact adhesive to machine parts with which the sheet border comes in contact, regardless of whether it is pulled in and processed with the narrow or wide side. The sheet of labels according to the invention is also employable in all other further processing equipment (for example, printing machines) without transferring contact adhesive particles on a machine part, regardless of which side it is pulled in and processed. Furthermore, the course of subsequent sheets of labels are not negatively influenced by contact adhesive particles left behind. The sheet of labels can be easily distributed after passing through copiers, electronic data processing printers or other further processing equipment, does not interlock in stacks, and is easily separated from stacks by hand because no interlocking occurs by contact adhesive escaping over the cut edges of the sheet of labels or by sticking contact adhesive particles.

The last named object relating to an economic production method for sheets of labels of the above mentioned type is solved by a method in which a label material constructed from non-stick substrate material, intermediate contact adhesive layer and top material is rolled out, optionally printed upon and then stamped. Subsequently, a matrix lattice ribbon of the top material is pulled off. Finally the remaining label material is longitudinally and transversely cut and/or transversely perforated and distributed and/or folded as sheets and then separated on the perforation lines into individual sheets, characterized in that the matrix lattice ribbon is pulled off from the top material at an angle alpha equaling 5°–90° to the direction of motion of the web of the continuously moving label material. In this connection, the respective outer longitudinal margins of the matrix lattice ribbon are led in such a way that they are freely movable vertical to the direction of motion of the matrix lattice ribbon in the plane of the pulled off matrix.

According to a preferred embodiment, the angle alpha is set to a value of 10°–70°, and particularly to a value of 20°–40°.

The pulling off of the matrix preferably occurs such that the outer longitudinal margins of the matrix lattice ribbon are pulled off, each over a down-holder and over a matrix guide roller which are positioned suitably to each other for the setting of the angle alpha.

In the case that the matrix lattice ribbon has inner longitudinal margins, down-holders for one or more of these inner longitudinal margins are preferably intended in addition to the down-holders for the outer longitudinal margins. Additionally, these are preferably installed vertically under the matrix guide roller on the label material web.

It is particularly advantageous when the vertical distance between the matrix guide roller and the plane of the web course of the continuously moving label material takes a value that corresponds to $1/10$–$5/10$ of the web width of the label material. Preferably for this, values are from $2/10$–$4/10$ of the web width. A range of $2.5/10$–$3.5/10$ is particularly favorable.

Furthermore, the matrix guide roller is preferably equipped with a particularly smooth surface, for example through polish or coating, with ball bearings or linear bearings such that the free mobility of the outer longitudinal margin of the matrix lattice ribbon is guaranteed. For this, linear bearings have been found to be particularly favorable.

A further preferred embodiment of the method intends that the matrix lattice ribbon in its course over the matrix guide roller is deflected from the original matrix plane at an angle beta equaling 5°–120°.

The above angle beta is at best set to a value of 10°–90°, wherein a value of 30°–70° is especially preferred.

The deflection at the angle beta preferably occurs through the interplay of the matrix guide roller and a deflection roller which are suitably positioned to each other for the setting of the angle beta.

Finally, the matrix lattice ribbon is preferably lead over the down-holder, the matrix guide roller, the down-holder(s) and the deflecting roller with a tension of 1–2N/mm.

The device suitable for carrying out the above method comprises a medium of unrolling for the label material, optionally printing machines, furthermore stamp and cutting tools, optionally a medium for perforation, equipment for guiding the unrolled label material and is characterized in that it comprises each a down-holder for the outer longitudinal margin of the matrix lattice ribbon and a matrix guide roller for this longitudinal margin.

In a preferred embodiment, the matrix guide roller is equipped with a linear bearing.

In a further form of the above device, down-holders for one or more inner longitudinal margins of the matrix lattice ribbon are designated.

Finally, the device preferably comprises a deflection roller for the matrix lattice ribbon.

BRIEF DESCRIPTION OF THE DRAWINGS

The method according to the invention and a suitable device therefor are more closely illustrated in the following on the basis of the FIGURE according to a preferred embodiment.

FIGURE: Representation of a preferred embodiment of the method according to the invention and a device for this.

DESCRIPTION OF THE PREFERRED EMBODIMENTS

In the production of the sheet of labels, the label material is lead in each case over a down-holder (1) for the outer longitudinal margin, wherein the matrix lattice ribbon is pulled off from the top material at an angle alpha by means of the matrix guide roller (2). The linear bearing (3) attached to the matrix guide roller (2) thus allows that the outer longitudinal margins of the matrix lattice ribbon lead over the matrix guide roller (2) are movable in the direction of the cross margins of the lattice. In the case that the matrix lattice ribbon has inner longitudinal margins, down-holders (4) for one or more of these margins are designated vertically under the matrix guide roller (2). Additionally, the matrix guide roller (2) and the plane of the web course (6) of the continuously moving label material have a vertical distance b to each other. Finally, the matrix is deviated from the original matrix plane over a deflection roller (5) at an angle beta.

Through the claimed method it is possible to prevent and/or to hold negligible an excessive stretching of the cross margins and a notch effect in the junctions of longitudinal and cross margins such that no break of the matrix material appears crosswise to the direction of motion of the web. The pulling off of the cross margins occurs at the same time from both longitudinal sides of the label material progressively from outside to inside, and the angle between the continuously moving label material web and pulled off matrix cross margin lies over the entire pulling off region so that a small separation force is set. With the claimed method it is possible to set production speeds (web running speeds) of greater than 100 m/min, especially up to 200 m/min.

The invention is more closely illustrated through the following Examples.

EXAMPLE 1

A 220 mm wide roll of label material comprising white, wood-free, mill-finished paper (surface area weight 60 g/m$^2$), transparent, colorless, polyacrylate contact adhesive (surface weight 15 g/m$^2$) and white silicone paper coated on one-side (surface area weight 60 g/m$^2$), wherein the separation force between the silicone paper (substrate material) and the paper (top material) amounts to 0.10±0.03N/25 mm, is processed in a label printing machine to planned sheets of labels such that the substrate of the sheet of labels assumes the German Industry Standard A4 format.

In this connection, the label material is first lead through a rotative stamp, exactly passing such that the top material is stamped out in the format 296.0×209.0 mm. Furthermore, the stamping occurs such that the distance between two succesive top material forms amounts to 1.0 mm.

The top material matrix lying around the stamped out forms is in each case pulled off over a down-holder (1) for the outer longitudinal margins, a matrix guide roller (2) with linear bearing (3) and a deflection roller (5) with angles alpha=30 and beta=60 and at a distance b=60 mm as well as a web running speed of 150 m/min.

Subsequently, the continuously moving web or matrix material is trimmed with cutting knives rotating in the direction of motion of the web such that they have a width of 210.0 mm and the left and right substrate material edges each project 0.5 mm over the top material edges.

The sidewise trimmed continuous web is lead through a rotative cross cutter, exactly passing, such that the free lying substrate material zone is split in the middle between two top material forms crosswise to the direction of motion of the web.

The resulting sheets of labels are lead into a vertical stack and stacked on top of each other.

Under the microscope at a magnification of 420-fold, no contact adhesive particles are recognized on the outer substrate material cut edges of the sheets of labels produced in this manner. Also, after a run of 10,000 such sheets of labels through a laser printer, no contact adhesive particles are observable on the feed rollers and on the semi-conducting drum under the microscope at a 420-fold magnification.

EXAMPLE 2

A 428 mm wide roll of label material of the type named in Example 1 is rotatively stamped such that in each case two top material forms lying next to each other are stamped out each with 296.0×209.0 mm. The distance between the neighboring forms amounts to 2.0 mm. Furthermore, the distance between two succesive forms in the direction of motion of the web is established at 1.0 mm.

Subsequently, the top material matrix is pulled off, each over a down-holder (1) for the outer longitudinal margins, a matrix guide roller (2) with linear bearing (3) for the outer longitudinal margins, a down-holder (4) for the inner longitudinal margin which is positioned vertical under the matrix guide roller (2), and a deflection roller (5). The angle setting and the web running speed occurs according to Example 1, the distance b amounts to 110 mm.

Finally, the label material web is cut left, in the middle, and right with cutting knives rotating in the direction of motion of the web, and thereafter cut in the middle with a rotating cross cutter between two successive top material forms in the direction of motion of the web such that in each case two sheets of labels of the format 297.0×210.0 mm arise next to each other, wherein the left and the right substrate material edge each project 1.0 mm and the top and bottom substrate material edge each project 0.5 mm over the top material edge.

The microscopic test according to Example 1 recognizes no contact adhesive particles on the substrate material cut edges and on the feed roller and/or the semi-conducting drum.

We claim:

1. Sheet of labels comprising non-stick substrate material, intermediate contact adhesive and top material adhered to the substrate through the contact adhesive, wherein surface area of the top material is smaller than the substrate material such that the substrate material edge projects over the top material edge on all sides, and distance between the substrate material edge and top material edge amounts to 0.1 to 2.0 mm, and said sheet constituting a single sheet of labels with the substrate material edge projecting over the top material edge on all sides thereof.

2. Sheet of labels according to claim 1, wherein the distance between the substrate material edge and top material edge amounts to 0.2 to 1.0 mm.

3. Sheet of labels according to claim 1, wherein said sheet is rectangularly-shaped.

4. Sheet of labels according to claim 1, wherein the substrate material surface area and/or the top material surface area is printed upon, coated, cut, stamped and/or perforated.

5. Sheet of labels according to claim 4, wherein the top material surface area is divided into individual section surface areas.

6. Sheet of labels according to claim 5, wherein individual section surface areas of the top material are pulled off.

7. Sheet of labels according to claim 5, wherein the top material between individual sections is pulled off.

8. Sheet of labels according to claim 5, wherein the section surface area is triangular, rectangular, quadrangular, polygonal, round or oval.

9. Sheet of labels according to claim 8, wherein the rectangular or square section surface areas have rectangular, evenly polygonal or round edges.

10. Sheet of labels according to claim 1, structured and arranged for printing in an electronic data processing printer.

11. Sheet of labels according to claim 1, structured and arranged for copying in copying equipment.

12. Sheet of labels comprising non-stick substrate material, intermediate contact adhesive and top material adhered to the substrate through the contact adhesive, wherein the surface area of the top material is smaller than the substrate material such that the substrate material edge projects over the top material edge on all sides and distance between the substrate material edge and top material edge amounts to 0.1 to 2.0 mm, and prepared by the method for production of sheets of labels in which a label material constructed from non-stick substrate material, intermediate contact adhesive layer and top material is rolled out, optionally printed upon and then stamped, subsequently a matrix lattice ribbon of the top material is pulled off and finally the remaining label material is longitudinally and transversely cut and/or transversely perforated and distributed as sheets and/or folded as sheets and then separated on the perforation lines into individual sheets, wherein the matrix lattice ribbon is pulled off from the top material at an angle alpha equaling 5°–90° to the direction of motion of the web of the continuously moving label material and in this connection leads the respective outer longitudinal margins of the matrix lattice ribbon such that they are freely movable vertical to the direction of motion of the matrix lattice ribbon in the plane of the pulled off matrix, and said sheet constituting a single sheet of labels with the substrate material edge projecting over the top material edge on all sides thereof.

13. Sheet of labels according to claim 12, wherein the angle alpha is set to a value of 10°–70°.

14. Sheet of labels according to claim 13, wherein the angle alpha is set to a value of 20°–40°.

15. Sheet of labels according to claim 12, wherein the outer longitudinal margins of the matrix lattice ribbon are pulled off, each over a down-holder (1) and over a matrix guide roller (2) which are positioned suitably to each other for the setting of the angle alpha.

16. Sheet of labels according to claim 15, wherein the matrix guide roller (2) is equipped with a linear bearing (3) which guarantees the free mobility of the outer longitudinal margins.

17. Sheet of labels according to claim 15, wherein one or more inner longitudinal margins of the matrix lattice ribbon are pulled off over down-holder (4).

18. Sheet of labels according to claim 17, wherein the down-holder(s) (4) is (are) provided vertically under the matrix guide roller (2) on the label material web.

19. Sheet of labels according to claim 15, wherein the vertical distance between the matrix guide roller (2) and the web motion plane (6) of the continuously moving label material is set to a value corresponding to $\frac{1}{10}$–$\frac{5}{10}$ of the web width of the label material.

20. Sheet of labels according to claim 15, wherein the matrix lattice ribbon in its course over the matrix guide roller is deflected from the original matrix plane at an angle beta equaling 5°–120°.

21. Sheet of labels according to claim 20, wherein deflection is carried out through the interplay of the matrix guide roller (2) and a deflecting roller (5) which are positioned with respect to each other so that the angle beta is set.

22. Sheet of labels according to claim 21, wherein the matrix lattice ribbon is lead over the down-holder (1), the matrix guide roller (2), optionally the down-holder(s) and the deflecting roller (5) with a tension of 1–2N/mm.

23. Sheet of labels according to claim 12, comprising a medium of unrolling the label material, optionally printing machines, furthermore stamp and cutting tools, optionally a medium for perforation, equipment for guiding the unrolled label material and the pulled off matrix lattice ribbon of the top material, wherein a down-holder (1) for the outer longitudinal margin of the matrix lattice ribbon and a matrix guide roller (2) for these longitudinal margins are provided.

24. Sheet of labels according to claim 23, wherein the matrix guide roller (2) is equipped with a linear bearing (3).

25. Sheet of labels according to claim 23, wherein down-holders (4) for one or more inner longitudinal margins of the matrix lattice ribbon are provided.

26. Sheet of labels according to claim 23, wherein a deflection roller (5) for the matrix lattice ribbon is provided.

27. Sheet of labels according to claim 5, comprising several labels being cut, stamped and/or perforated in both the transverse and longitudinal directions along the sheet.

28. Sheet of labels according to claim 12, comprising several labels being cut, stamped and/or perforated in both the transverse and longitudinal directions along the sheet.

29. Sheet of labels according to claim 1, possessing a surface area weight of 80 to 300 g/m$^2$.

30. Sheet of labels according to claim 29, possessing a surface area weight of 120 to 200 g/m$^2$.

31. Sheet of labels according to claim 1, wherein the non-stick substrate material is composed of paper, cardboard, a plastic or metal foil or integrated systems thereof, and possesses at least on a side facing the contact adhesive, a separation agent constituted by silicone.

32. Sheet of labels according to claim 31, wherein the contact adhesive is selected from the group consisting of rubber, poly(meth)acrylate, polyvinyl derivative or a copolymer thereof, polyamide, copolyamide, polyester, copolyester, copolyether, polyurethane, polyepoxide, polysiloxane, or mixtures thereof.

33. The sheet of labels according to claim 32, wherein the top material is composed of paper, cardboard, plastic or metal foils or integrated systems thereof.

34. Sheet of labels according to claim 1, being structured and arranged such that contact adhesive is not transferred to machine parts with which a sheet border comes into contact when being processed in copiers and electronic data processing printers, regardless of whether said sheet is pulled in and processed with its narrow or wide side, said sheet also being employable in all other further processing equipment such as printing machines without transferring contact adhesive particles onto machine parts regardless of which side the sheet is pulled in and processed by, course of subsequent sheets of labels is not adversely affected by contact adhesive particles left behind from previously-processed sheets of labels, the sheets of labels can be easily distributed after passing through copiers, electronic data processing printers or other further processing equipment, and the sheets of labels do not interlock in stacks and are easily separated from stacks by hand because interlocking, caused by contact adhesive escaping over cut edges of the sheets of labels or by sticking of contact adhesive particles, is prevented.

35. Sheet of labels according to claim 12, being structured and arranged such that contact adhesive is not transferred to machine parts with which a sheet border comes into contact when being processed in copiers and electronic data processing printers, regardless of whether said sheet is pulled in and processed with its narrow or wide side, said sheet also being employable in all other further processing equipment such as printing machines without transferring contact adhesive particles onto machine parts regardless of which side the sheet is pulled in and processed by, course of subsequent sheets of labels is not adversely affected by contact adhesive particles left behind from previously-processed sheets of labels, the sheets of labels can be easily distributed after passing through copiers, electronic data processing printers or other further processing equipment, and the sheets of labels do not interlock in stacks and are easily separated from stacks by hand because interlocking, caused by contact adhesive escaping over cut edges of the sheets of labels or by sticking of contact adhesive particles, is prevented.

* * * * *